US006779254B1

(12) United States Patent
Herr et al.

(10) Patent No.: US 6,779,254 B1
(45) Date of Patent: Aug. 24, 2004

(54) WIRE PRESENTATION DEVICE FOR POWER SPLICE TERMINAL

(75) Inventors: Marlin Edward Herr, Gardners, PA (US); John Michael Wasilko, Harrisburg, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 10/440,627

(22) Filed: May 19, 2003

(51) Int. Cl.[7] .......... B23P 19/00

(52) U.S. Cl. .......... 29/753

(58) Field of Search .......... 29/753, 751, 761, 29/857, 861, 863

(56) References Cited

U.S. PATENT DOCUMENTS 3,693,230 A * 9/1972 Morgan .......... 29/753
4,080,731 A * 3/1978 Hammond et al. .......... 29/715
5,626,152 A * 5/1997 Davis et al. .......... 131/84.1

* cited by examiner

*Primary Examiner*—Chau N. Nguyen

(57) ABSTRACT

A wire presentation device for a terminal including a saddle includes at least one guard wall, and at least one guide member rotatably mounted to the guard wall and positionable between a loading position and a crimping position. The guide member is configured to funnel wire into the saddle of the terminal in the loading position. The guard wall includes a curved guide slot therein, the at least one guide member extends proximate the slot. A spring element biases the guide member in the loading position and a position of the guide member relative to the guard wall is adjustable. The guide member has a contoured outer surface, and the outer surface has a flat section therein for accommodating an adjustable positioning member. The guide member is configured to be positioned away from the terminal when in the crimping position.

20 Claims, 4 Drawing Sheets

WIRE PRESENTATION DEVICE FOR POWER SPLICE TERMINAL

BACKGROUND OF THE INVENTION

The invention relates generally to power splice terminals for coil winding applications, and more specifically, to a wire presentation device to facilitate loading of wires into a power splice terminal.

Magnet wires arc used to form coil windings for a variety of electrical devices. When energized, the coil windings generate magnetic fields and electromagnetic forces to drive, for example, a rotor of an electric motor. When the magnet wire is installed into a stator structure of the motor, the windings cause the rotor to rotate when the stator windings are energized. To supply power to the, windings, power splice terminals are sometimes employed to couple a power lead, wire to the magnet wires.

One type of power splice terminal includes an upper saddle which accepts a lead wire or lead wires, and a lower saddle which accepts a number of magnet wires used in the coil windings. When the lead wires and the magnet wires are loaded into the respective upper and lower saddles of the terminal, the terminal is crimped or bent to secure the wires to the terminal. The lower saddle includes serrations formed therein which pierce the insulation of the magnet wires to establish electrical connection to the terminal in the lower saddle when the terminal is crimped. The lead wires are crimped in the upper saddle to establish electrical connection of the lead wire to the terminal. Electrical connections of the lead wires and the magnet wires through the terminal are therefore established.

Loading the wires into the terminal, however, is problematic. For instance, in some applications eight magnet wires may be loaded into the lower saddle of an open barrel pigtail terminal. Positioning this many magnet wires efficiently and correctly into the lower saddle of the terminal can be challenging. If the magnet wires are not positioned properly, the electrical connection through the terminal may be compromised, and the associated electrical device may not function properly.

BRIEF DESCRIPTION OF THE INVENTION

In accordance with an exemplary embodiment, a wire presentation device for a terminal including a saddle is provided. The wire presentation device comprises at least one guard wall, and at least one guide member rotatably mounted to the guard wall and positionable between a loading position and a crimping position. The guide member is configured to funnel wire into the saddle of the terminal in the loading position.

Optionally, the guard wall includes a curved guide slot therein, the at least one guide member extends proximate the slot. A spring element biases the guide member in the loading position and a position of the guide member relative to the guard wall is adjustable. The guide member includes a head section and a fin section extending from the head section. The guide member has a contoured outer surface, and the outer surface has a flat section therein for accommodating an adjustable positioning member. The guide member is configured to be positioned away from the terminal when in the crimping position.

In another exemplary embodiment of the invention, a wire presentation device for a power splice terminal including a saddle is provided. The wire presentation device comprises first and second guard walls extending substantially parallel to one another and separated by a distance to contain the terminal therebetween. At least one guide member is suspended between the first guard wall and the second guard wall, and the guide member being configured to funnel wire into the saddle of the terminal when the terminal is located between the first guard and the second guard. The guide member is positionable away from the terminal when the terminal is crimped.

In another exemplary embodiment of the invention, a wire presentation device for a power splice terminal including an upper saddle for accepting a lead wire and a lower saddle for accepting a magnet wire is provided. The wire presentation device comprises first and second guard walls extending substantially parallel to one another and separated by a distance to contain the terminal therebetween. A pair of guide members suspended between the first guard wall and the second guard wall and separated by an adjustable distance from one another. The pair of guide members are configured to funnel wire into the lower saddle of the terminal when the terminal is located between the first guard wall and the second guard wall, and the pair of guides members are positionable away from the terminal when the terminal is crimped.

DETAILED DESCRIPTION OF THE INVENTION

Figure 1:
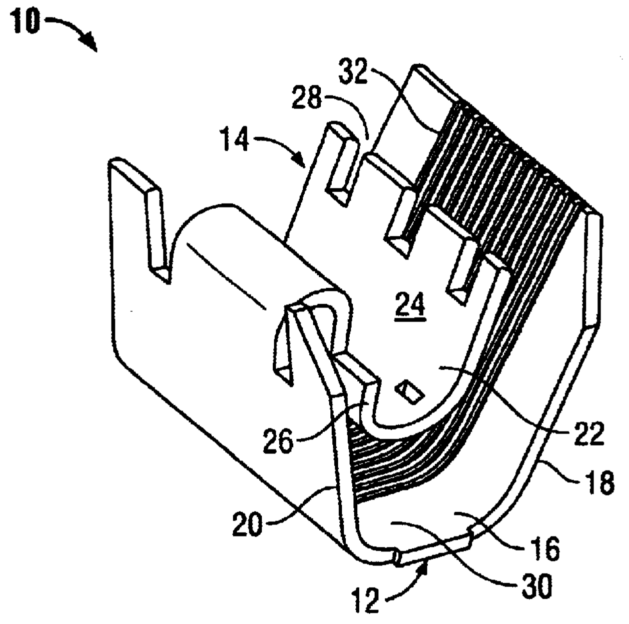
FIG. 1 (Prior Art)
FIG. 1 is a perspective view of a known power splice terminal which is to be loaded with multiple wires.

FIG. 1 is a perspective view of a known power splice terminal 10. While the invention is described with respect to a power splice terminal, it is contemplated that the invention may be used with other types of terminals that receive multiple wires. Power splice terminal 10 is therefore described and illustrated herein for illustrative purposes only, and the invention is not intended to be restricted to any particular terminal configuration, such as the power splice terminal 10.

Power splice terminal 10 is integrally formed from a conductive material into a lower channel section, sometimes referred to as a lower saddle 12, and an upper channel section, sometimes referred to as an upper saddle 14. The lower saddle 12 includes a bottom wall 16 and opposite side walls 18 and 20 extending from the bottom wall 16 at an obtuse angle thereto. The upper saddle 14 extends from one of the side walls 20 of the lower saddle 12, and the upper saddle 14 also includes a bottom wall 22 and opposite side walls 24 and 26 extending at an angle from the bottom wall 22. One side wall 26 of the upper saddle 14 extends continuously from one of the side walls 20 of the lower saddle 12. The other side walls 18, and 24 of the respective, lower and upper saddles 12 and 14 are separated from one another by a specified distance, thereby forming a gap 28 therebetween. Additionally, the bottom wall 22 of the upper saddle 14 and the bottom wall 16 of the lower saddle 12 are separated by a predetermined distance to form a gap 30 therebetween.

Power splice terminal 10 is known as an "Open Barrel Pigtail" terminal, and is commercially available, from Tyco Electronics Corporation. In use, the lower saddle 12 receives a number of magnet wires (not shown in FIG. 1) in gaps 28 and 30 and the upper saddle 14 receives a lead wire (not shown in FIG. 1) as explained below. The lower saddle 12 includes serrations 32 on an outer surface thereof to pierce through insulation on the magnet wires loaded into the lower saddle 12 when the power splice terminal 10 is crimped, as also described further below.

Figure 2:
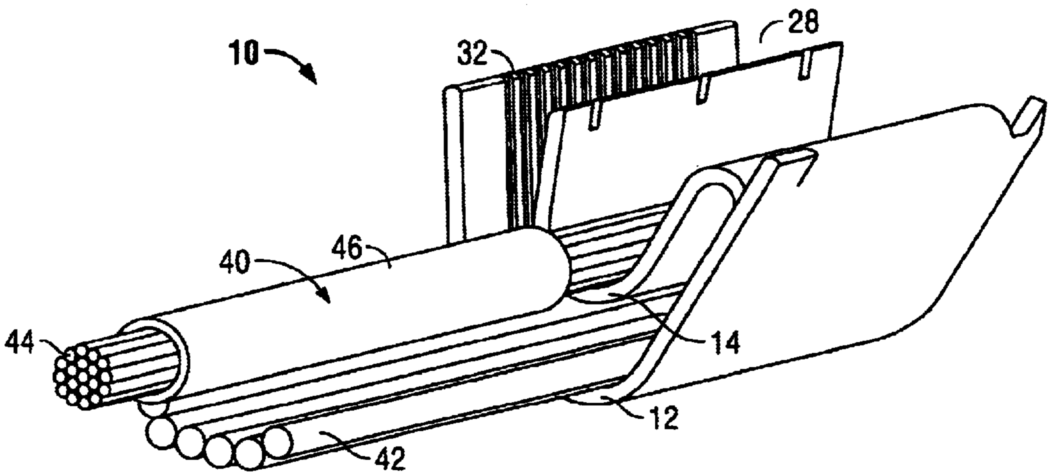
FIG. 2 (Prior Art)
FIG. 2 is a perspective view of the terminal shown in FIG. 1 with a lead wire and magnet wires loaded therein.

FIG. 2 is a perspective view of the power splice terminal 10 illustrating a lead wire 40 loaded into the upper saddle 14 and a number of magnet wires 42 loaded into the lower saddle 12. The lead wire 40 includes a number of conductors 44 surrounded by an insulation sheath 46. The insulation sheath 46 is stripped from the lead wire 40 proximate the upper saddle 14 so that when the power splice terminal 10 is crimped an electrical connection is established between the conductors 44 and the upper saddle 14. In the crimping process, the upper saddle 14 is bent about the stripped lead wire 40.

The magnet wires 42 are inserted into the lower saddle 12 through the gap 28 between the lower and upper saddles 12 and 14 along one side thereof and are fitted into the gap 30 between bottom walls 16 and 22 the lower saddle 12 and the upper saddle 14. The magnet wires 42 also include an outer layer or layers of insulation, enamel coatings, etc. The serrations 32 on the lower saddle 12 pierce through the insulation and coatings on the magnet wire 42 to contact conductive portions of the magnet wire 42 when the power splice terminal 10 is crimped. During the crimping process, the lower saddle 12 is bent to securely retain the magnet wires 42 and to close the gaps 28 and 30 between the lower and upper saddles 12 and 14.

After crimping the power splice terminal 10, the lead wire 40 is coupled to a power supply (not shown), and current flows from the lead wire 40 to the upper saddle 14. The current flows from the upper saddle 14 to the lower saddle 12, and ultimately to the magnet wires 42 which may for example, form a coil winding in an electrical device (not shown). In at least some applications, eight magnet wires 42 and a lead wire 40 must be loaded into the power splice terminal 10 by a single operator, and the power splice terminal 10 is crimped automatically by a machine in a terminal crimping station (described below). Managing the wires 40 and 42 during the loading and crimping process by a single operator is a challenging task. The power splice terminals 10 can only be crimped as fast as the power splice terminals 10 can be loaded with the lead wire 40 and the magnet wires 42. Thus, if the wires 40 and 42 cannot be efficiently loaded into the power splice terminal 10, manufacturing operations of an electrical device including the power splice terminals 10 are negatively impacted. Further, if the wires 40 and 42 are not properly loaded, the reliability of the electrical connection through the power splice terminal 10 may be compromised, and the operability of the associated electrical device may also be compromised.

Figure 3:
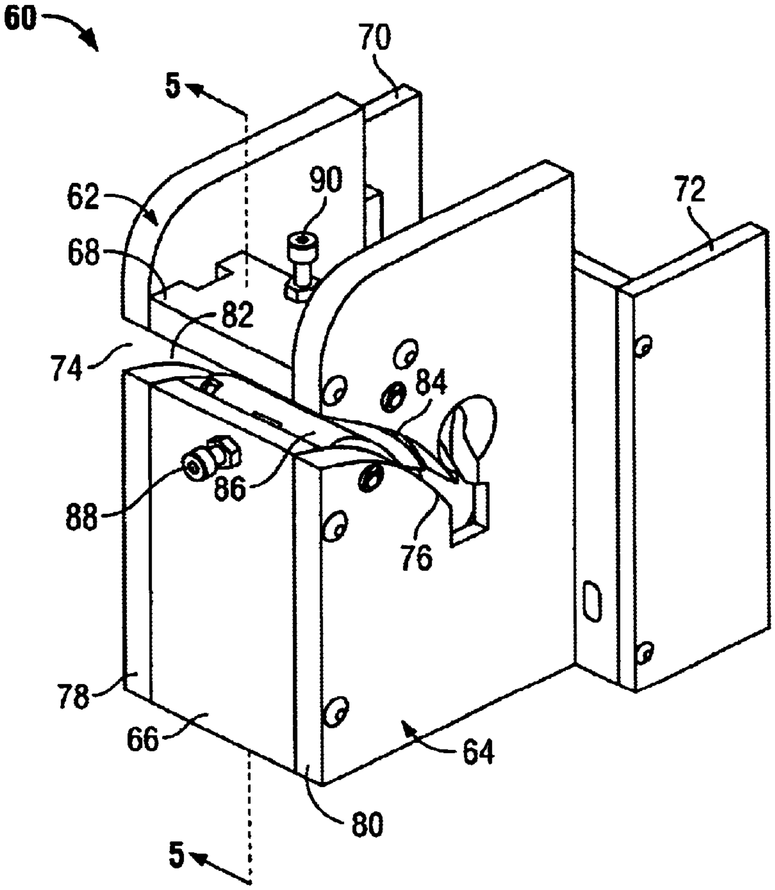
FIG. 3 is a perspective view of a wire presentation device formed in accordance with an embodiment of the present invention for loading wires into the terminal shown in FIG. 1.

FIG. 3 is a perspective view of a wire presentation device 60 to facilitate loading of wires into the power splice terminal 10 (shown in FIGS. 1 and 2) for improved crimping operations and reliability. The wire presentation device 60 includes a left guard wall 62, a right guard wall 64, a front guard wall 66, and a top guard wall 68. Mounting brackets 70, 72 extend from each respective left and right guard walls 62, 64 so that the wire presentation device may be installed to an automatic crimping station (described below). The guard walls 62–68 provide a safety barrier around the crimping zone in the crimping station when the wire presentation device 60 is installed.

Each of the left and right guard walls 62 and 64 include a respective guide slot 74 and 76. The guide slots 74 and 76 each extend from a leading edge 78 and 80 of the respective left and right guards 62 and 64, and the guide slots 74 and 76 extend along a curved path toward a center of the left and right guards 62 and 64. The front and top guard walls 66 and 68 are separated from one another along the leading edges 78 and 80 of the left and right guard walls 62, 64 in the vicinity of the guide slots 74 and 76. The left and right guards 62 and 64 and the front and top guards 66 and 68 thereby form a guide opening 82 extending across the front of the wire presentation device 60 between the guide slots 74 and 76.

Guide members 84 and 86 are suspended between the left and right guard walls 62 and 64 on either side of the guide slots 74 and 76 and also on either side of the guide opening 82. The guide members 84 and 86 funnel wire, such as wires 40 and 42 (shown in FIG. 2), to the lower saddle 12 of a power splice terminal 10 when the wire is extended through the guide slots 74 and 76, as explained further below. Adjust screws 88 and 90 arc provided on each respective front guard wall 66 and the top guard wall 68. The adjust screws 88 and 90 position the guide members 84 and 86 relative to the guide slots 74 and 76 to accommodate different sizes and numbers of magnet wires 42 (shown in FIG. 2).

Figure 4:
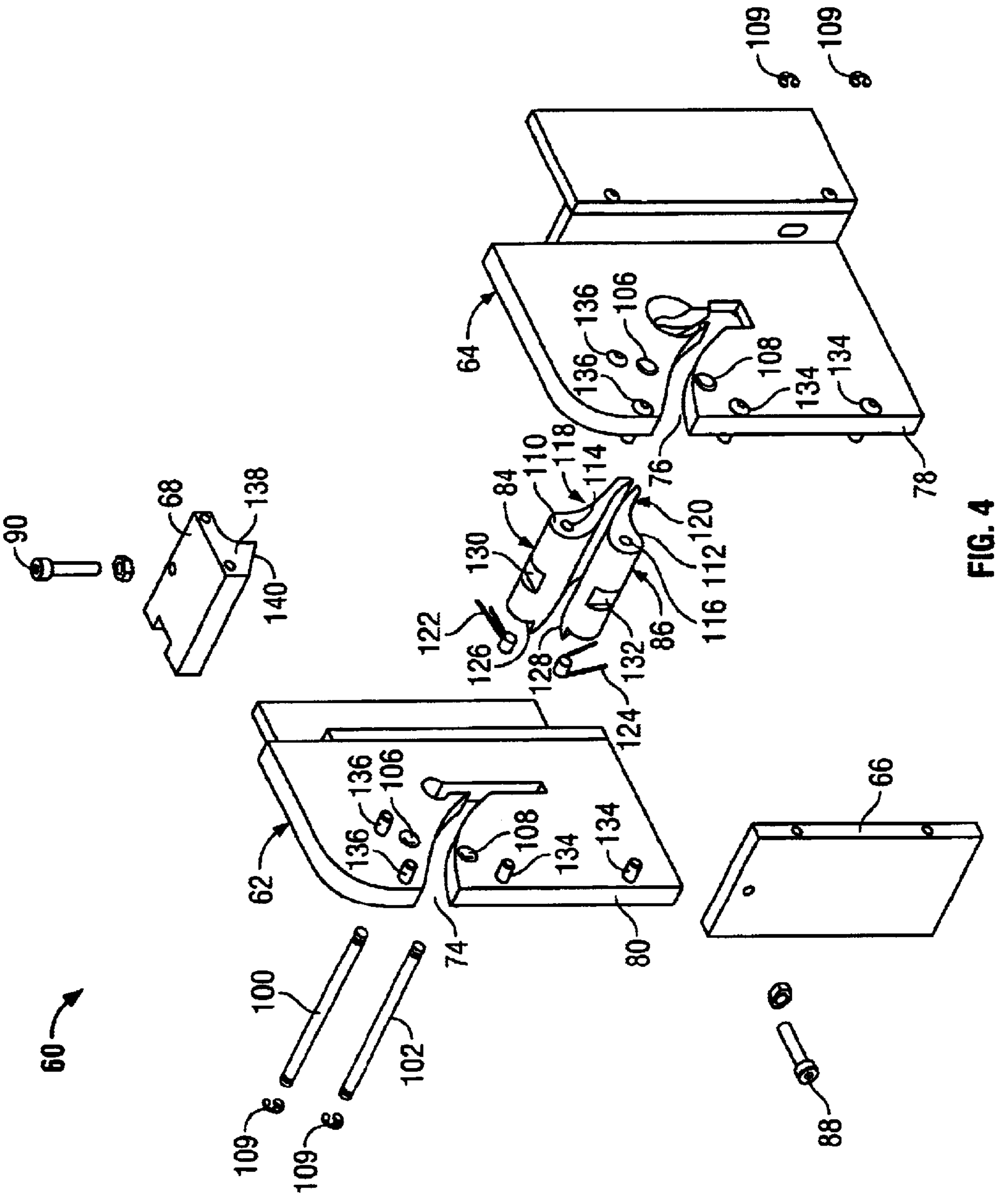
FIG. 4 is an exploded perspective view of the wire presentation device shown in FIG. 3.

FIG. 4 is an exploded perspective view of the wire presentation device 60. The guide members 84 and 86 are suspended between the left and right guards walls 62 and 64 on cylindrical shafts 100 and 102 which extend through respective apertures 106 and 108 in each of the left guard wall 62 and the right guard wall 64. The shafts 100 and 102 are fastened the left and right guard walls 62 and 64 with retaining clips 109. Each of the guide members 84 and 86 includes a respective head section 110 and 112 including a bore 114 and 116 through which the respective shaft 100 and 102 extends, thereby facilitating a rotational or swinging movement of the head sections about the shafts 100 and 102. The guide members 84 and 86 further include respective fin sections 118 and 120 extending from the head sections 110 and 112, and the fin sections 118 and 120 are curved to facilitate placement of the magnet wires 42 (shown in FIG. 2) between the fin sections 118 and 120.

Torsion spring elements 122 and 124 are provided on each of the shafts 100 and 102, and the spring elements 122 and 124 interface with a respective flat 126 and 128 extending from one end of each of the head sections 110 and 112 of the guide members 84 and 86. The torsion spring elements 122 and 124 bias the guide members 84 and 86 in a loading position for loading of wire, but permit the guide members 84 and 86 to be positioned away from the power splice terminal 10 in a crimping position explained below. Positioning members in the form of adjust screws 88 and 90 extend through the front guard wall 66 and the top guard wall 68, and flats 130 and 132 are provided in the center of each of the head sections 110 and 112 of the guide members 84 and 86. The adjust screws 88 and 90 engage the flats 130 and 132 to position the guide members 84 and 86 in a desired orientation relative to the left and right guard walls 62 and 64, and more specifically with respect to the guide slots 74 and 76.

The front guard wall 66 is coupled to the left and right guard walls 62 and 64 with screws 134, and the top guard wall 68 is attached to the left and right guards 62 and 64 with screws 136. It is recognized, however, that other attachment members and schemes could be employed in lieu of screws 134 and 136 in alternative embodiments of the invention to assemble the guard walls 62–68. Additionally, it is contemplated that one or more of the guard walls 62–68 may be formed together in alternative embodiments to reduce the number of components to assemble.

The top guard wall 68 includes a tapered front end 138. The tapered front end 138 forms a guide surface 140 extending between the leading edges 78 and 80 of the left and right guard walls 62 and 64 when the wire presentation device 60 is assembled.

Figure 5:
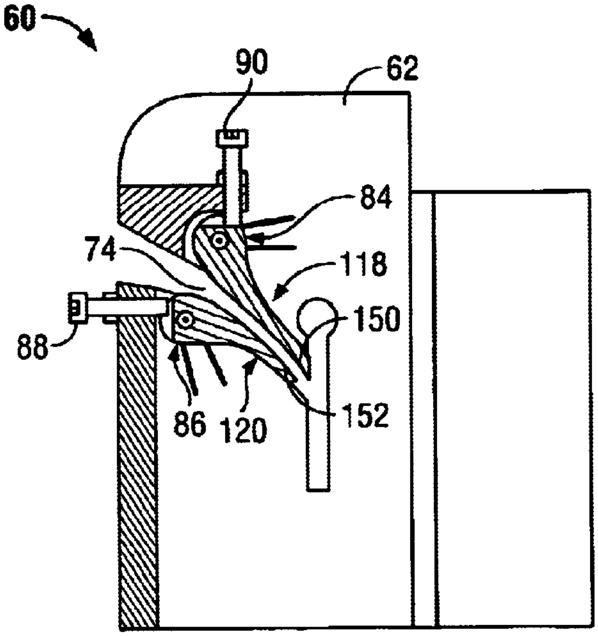
FIG. 5 is a cross sectional view of the wire presentation device taken along line 5—5 of FIG. 3.

FIG. 5 is a cross sectional view of the wire presentation device 60 illustrating guide members 84 and 86 in position for loading of magnet wires 42 (shown in FIG. 2). Each of the fin sections 118 and 120 includes a respective guide surface 150, 152 extending into the guide slots 74 and 76 of the left and right guard walls 62 and 64. As wire is loaded into the wire presentation device 60 between the guide slots 74 and 76 and between the guide members 84 and 86, the guide surfaces 150 and 152 funnels the wire into a power splice terminal 10 (shown in FIGS. 1 and 2) located at the ends of the fin sections 118 and 120 of the guide members 84 and 86. By turning the adjust screws 88 and 90, the distance that the guide members 84 and 86 extends into the guide slots 74 and 76 can be increased or decreased to accommodate different sizes of wires. For example, the distance between the guide members 84 and 86 can be increased or decreased by manipulating the adjust screws 88 and 90 so that larger or smaller wires may be inserted between the guide members 84 and 86.

As illustrated in FIG. 5, one of the guide surfaces 150 is concave and the other guide surface 152 is convex, and the guide surfaces 150 and 152 are located proximal to the: curved guide slots 74 and 76. It is recognized, however, that other configurations of guide surfaces 150 and 152 may be employed in conjunction with the same or differently shaped guide slots 74 and 76 in various alternative embodiments of the invention.

Figure 6:
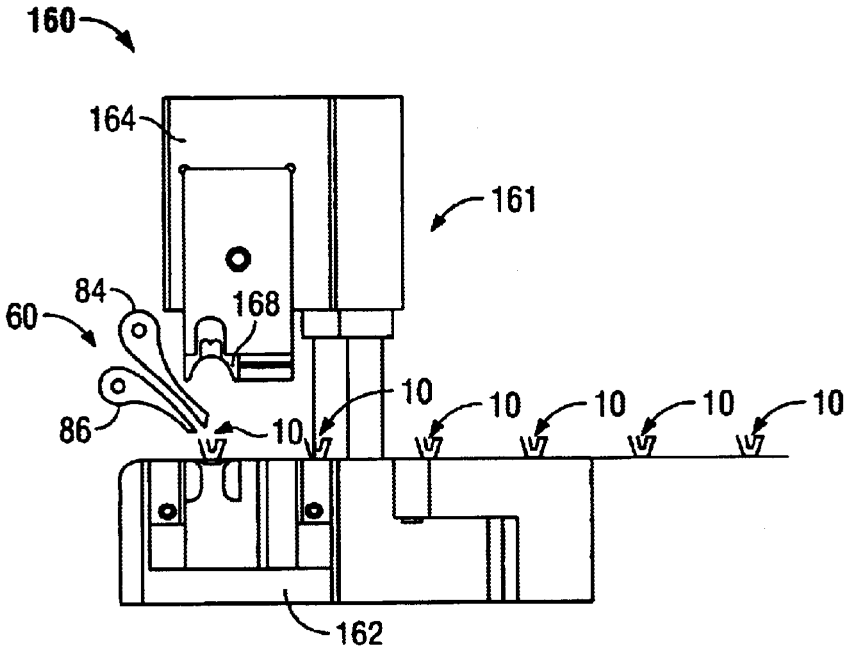
FIG. 6 is a side elevational schematic view of a terminal crimping station utilizing the magnet wire presentation device shown in FIGS. 3–5 in a loading position.

FIG. 6 is a side elevational schematic view of a terminal crimping station 160 illustrating the wire presentation device 60 in a loading position and with the guide walls 62–68 (shown in FIGS. 2–5) removed for clarity. The terminal crimping station 160 includes an applicator 161 having a base 162 and a ram assembly 164. The ram assembly 164 includes a crimper 168, and the ram assembly is reciprocally movable between toward and away from the base 162. The ram assembly 164 is driven by a press machine (not shown) to crimp power splice terminals 10 situated between the left and right guard walls 62 and 64 in the wire presentation device 60.

The guide members 84 and 86 are positioned relative to one of the power splice terminals 10 in the terminal crimping station 160 so that when a wire is inserted between the guide members 84 and 86, the guide members 84 and 86 direct the wire into the power splice terminal 10, or more specifically into the lower saddle 12 (shown in FIGS. 1 and 2).

Figure 7:
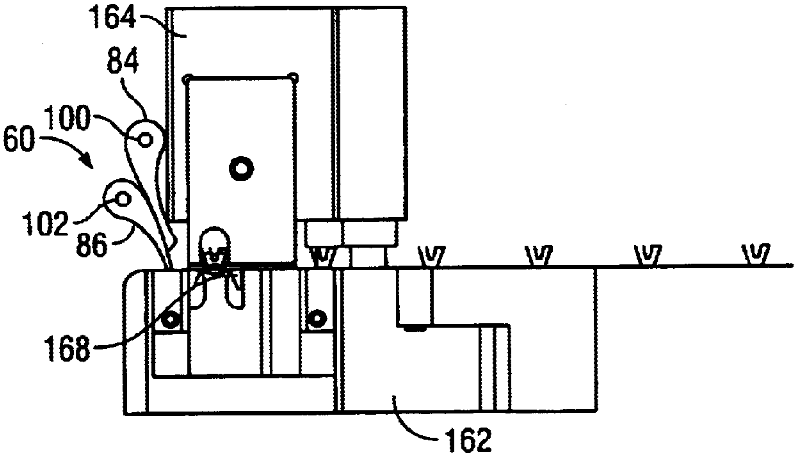
FIG. 7 is a side elevational schematic view of the terminal crimping station shown in FIG. 6 in a crimping position.

FIG. 7 is a side elevational schematic view of the terminal crimping station 160 illustrating the wire presentation device 60 in a crimping position and with the guide walls 62–68 (shown in FIGS. 2–5) removed for clarity. When the wires 40 and 42 (shown in FIG. 1) are properly loaded into the power splice terminal 10 beneath the guide members 84 and 86, the ram assembly 164 is descended onto the base 162 such that the crimper 168 contacts the power splice terminal 10 in the crimping position. The ram assembly 164 contacts the guide member 84 as it descends toward the base 162 and pivots the guide member 84 against the bias of the spring element 122 (shown in FIG. 4) away from the path of the ram assembly 164. The guide member 84, in turns, contacts the guide member 86 and pivots the guide member 86 away from the path of the ram assembly 164 against the bias of spring element 124 (shown in FIG. 4). In the crimping position, both the guide members 84 and 86 are pivoted about the respective shafts 100 and 102 to a position alongside the ram assembly 164 and away from the power splice terminal 10 where the guide members 84 and 86 do not interfere with the crimping of the power splice terminal 10.

Once the power splice terminal 10 is crimped, the ram assembly 164 ascends away from the base 162 and the guide members are released by the ram assembly 164. Once released, the spring elements 122 and 124 return to the loading position shown in FIG. 6. When another power splice terminal 10 is positioned into the wire presentation device 60, another power splice terminal 10 may be loaded with wires using the guide members 84 and 86 and the crimping process may be repeated.

The wire presentation device 60, by virtue of the guide members 84 and 86, promotes efficient and accurate loading of the power splice terminals 10 with wires. Loading of the terminals is simplified and operator error in the crimping operation is reduced. Reliable terminal connections are therefore established in an efficient crimping process.

While the invention has been described in terms of various specific embodiments, those skilled in the art will recognize that the invention can be practiced with modification within the spirit and scope of the claims.

What is claimed is:

1. A wire presentation device for a terminal including a saddle, said wire presentation device comprising:

at least one guard wall; and at least one guide member rotatably mounted to said guard wall and positionable between a loading position and a crimping position, said guide member being configured to funnel wire into the saddle of the terminal in the loading position.

2. A wire presentation device in accordance with claim 1 wherein said guard wall includes a curved guide slot therein, said at least one guide member extending proximate said slot.

3. A wire presentation device in accordance with claim 1 further comprising a spring element, said spring element biasing said guide member in the loading position.

4. A wire presentation device in accordance with claim 1 wherein position of said guide member relative to said guard wall is adjustable.

5. A wire presentation device in accordance with claim 1 wherein said at least one guide member comprises an upper guide member and a lower guide member, a position of at least one of said upper guide member and said lower guide member adjustable relative to said guard wall.

6. A wire presentation device in accordance with claim 1 wherein said guide member includes a head section and a fin section extending from said head section.

7. A wire presentation device in accordance with claim 1, wherein said at least one guide member comprises an upper guide member and a lower guide member, each of said upper and lower guide member having a contoured guide surface, one of said guide surfaces being convex and one of said guide surfaces being concave.

8. A wire presentation device in accordance with claim 1, wherein said guide member has a contoured outer surface, said outer surface having a flat section therein for accommodating an adjustable positioning member.

9. A wire presentation device in accordance with claim 1 wherein said guide member is configured to be positioned away from said terminal when in the crimping position.

10. A wire presentation device for a power splice terminal including a saddle, said wire presentation device comprising:

first and second guard walls extending substantially parallel to one another and separated by a distance to contain the terminal therebetween; and at least one guide member suspended between said first guard wall and said second guard wall, said guide member being configured to funnel wire into the saddle of the terminal when the terminal is located between the first guard and the second guard, said guide member being positionable away from said terminal when the terminal is crimped.

11. A wire presentation device in accordance with claim 10 wherein each of said first and second guard walls include a guide slot therein, said guide member located proximate to said guide slot.

12. A wire presentation device in accordance with claim 10 wherein a position of said guide member relative to said first guard wall and second guard wall is adjustable to accommodate various diameters of magnet wire.

13. A wire presentation device in accordance with claim 10 further comprising a front guard wall and a top guard wall extending between said first guard wall and said second guard wall, said front guard wall and said top guard wall defining an opening leading to said guide member.

14. A wire presentation device in accordance with claim 10 wherein said guide member includes a head section and a fin section extending from said head section.

15. A wire presentation device in accordance with claim 10, wherein said guide member has a contoured guide surface, said first and second guard walls including guide slots therein, said contoured guide surface extending into said slots.

16. A wire presentation device in accordance with claim 10, said at least one guide member including an upper guide member and a lower guide member, each of said upper guide member and lower guide member having a contoured outer surface, said outer surface having a flat section therein for accommodating an adjustable positioning member.

17. A wire presentation device for a power splice terminal including an upper saddle for accepting a lead wire and a lower saddle for accepting a magnet wire, said wire presentation device comprising:

first and second guard walls extending substantially parallel to one another and separated by a distance to contain the terminal therebetween; and a pair of guide members suspended between said first guard wall and said second guard wall and separated by an adjustable distance from one another, said pair of guide members being configured to funnel wire into the lower saddle of the terminal when the terminal is located between the first guard wall and the second guard wall, said pair of guides members being positionable away from said terminal when the terminal is crimped.

18. A wire presentation device in accordance with claim 17 wherein each of said first and second guard walls include a guide slot therein, said first and second guide members located on opposite sides of said guide slot.

19. A wire presentation device in accordance with claim 17 further comprising a top guard wall extending between said first and second guard wall, said front guard wall and said top guard wall defining an opening leading to said guide members.

20. A wire presentation device in accordance with claim 17 wherein said guides comprise a head section and a contoured fin section extending from said head section.

* * * * *